United States Patent
Feng et al.

(10) Patent No.: US 10,984,492 B2
(45) Date of Patent: Apr. 20, 2021

(54) MANAGING HOUSING SCORES USING SMART CONTRACTS IN BLOCKCHAIN NETWORKS

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/587,791

(22) Filed: Sep. 30, 2019

(65) Prior Publication Data
US 2020/0286195 A1    Sep. 10, 2020

Related U.S. Application Data

(63) Continuation of application No. PCT/CN2019/077215, filed on Mar. 6, 2019.

(51) Int. Cl.
*G06Q 50/16* (2012.01)
*G06F 16/23* (2019.01)
*G06F 21/62* (2013.01)

(52) U.S. Cl.
CPC ....... *G06Q 50/163* (2013.01); *G06F 16/2336* (2019.01); *G06F 21/629* (2013.01)

(58) Field of Classification Search
CPC .. G06Q 50/163; G06F 16/2336; G06F 21/629
(Continued)

(56) References Cited

U.S. PATENT DOCUMENTS

2009/0240565 A1    9/2009  Calonge
2012/0290486 A1   11/2012  Dobrowolski et al.
(Continued)

FOREIGN PATENT DOCUMENTS

CA    3026039 A1 * 12/2017 ............. G06Q 40/02
CN    107146152       9/2017
(Continued)

OTHER PUBLICATIONS

"What are Smart Contracts? Guide for Beginners." [online], archived on Feb. 25, 2019, available at: < https://web.archive.org/web/20190225040848/https://cointelegraph.com/ethereum-for-beginners/what-are-smart-contracts-guide-for-beginners (Year: 2019).*
(Continued)

*Primary Examiner* — Richard W. Crandall
(74) *Attorney, Agent, or Firm* — Fish & Richardson P.C.

(57) ABSTRACT

Disclosed herein are methods, systems, and apparatus, including computer programs encoded on computer storage media, for managing housing scores of residents using a smart contract executing within a blockchain network. The method includes: receiving, by a node of the blockchain network, a smart contract that defines operations for managing housing scores of residents, the operations including: a score inquiry operation, a score addition operation, a score deduction operation, a score redemption operation, and a score transfer operation; executing, by the node, one of the operations defined in the smart contract for managing a housing score of a specified resident; determining, by the node, if a current housing score of the specified resident triggers a reporting event; and in response to determining that the current housing score of the specified resident triggers the reporting event, reporting, by the node to the specified resident, the current housing score of the specified resident.

30 Claims, 7 Drawing Sheets

(58) Field of Classification Search
USPC .......................................................... 705/314
See application file for complete search history.

(56) References Cited

U.S. PATENT DOCUMENTS

| | | | |
|---|---|---|---|
| 2013/0262131 | A1 | 10/2013 | Lewis |
| 2016/0330034 | A1* | 11/2016 | Back ..................... G06Q 20/065 |
| 2017/0353311 | A1* | 12/2017 | Schukai ................ H04L 9/0618 |
| 2018/0047111 | A1* | 2/2018 | Vieira .................... G06Q 40/12 |
| 2018/0075527 | A1* | 3/2018 | Nagla ................. G06F 21/6218 |
| 2018/0322597 | A1* | 11/2018 | Sher .......................... H04L 67/22 |
| 2019/0058709 | A1* | 2/2019 | Kempf .................. H04L 9/3226 |
| 2019/0289068 | A1* | 9/2019 | Ma ......................... H04L 67/327 |
| 2019/0295162 | A1* | 9/2019 | Wang ........................ H04L 9/30 |
| 2019/0356672 | A1* | 11/2019 | Bondugula ........... H04L 63/205 |
| 2020/0286194 | A1* | 9/2020 | Li .................... G06K 19/06037 |

FOREIGN PATENT DOCUMENTS

| | | |
|---|---|---|
| CN | 107231299 | 10/2017 |
| CN | 108320173 | 7/2018 |
| CN | 108536360 | 9/2018 |
| CN | 109086619 | 12/2018 |
| CN | 109118332 | 1/2019 |
| CN | 109409882 | 3/2019 |
| CN | 109409976 | 3/2019 |
| JP | 2019028525 | 2/2019 |
| JP | 2019536380 | 12/2019 |
| WO | WO 2018142948 | 8/2018 |
| WO | WO 2018150606 | 8/2018 |

OTHER PUBLICATIONS

"Blockchain-Based Credit Scoring Outshines 'The Big Three.'" Medium.com, [online], Jul. 4, 2018, available at: < https://medium.com/colendi/blockchain-based-credit-scoring-outshines-the-big-three-cc169701ebb0 > (Year: 2018).*

"Points system forhukou to launch in Beijing," Chinadaily.com.cn, [online], published on Apr. 12, 2018, available at: < http://www.chinadaily.com.cn/a/201804/12/VVS5aceb9e4a3105cdcf6517c56.html > (Year: 2018).*

Xin Wen, "Points system for hukou to launch in Beijing," Chinadaily.com.cn, [online], published on Apr. 12, 2018, available at: < http://www.chinadaily.com.cn/a/201804/12/VVS5aceb9e4a3105cdcf6517c56.html > (Year: 2018).*

Kisagun, Can, "Decentralizing Credit with Enigma," Medium.com [online], published on Jun. 15, 2018, available at: < https://blog.enigma.co/decentralizing-credit-with-enigma-440c6648b4d8 > (Year: 2018).*

Colendi, Blockchain-Based Credit Scoring Outshines 'The Big Three,' Medium.com [online] published on Jul. 4, 2018, available at: <https://medium.com/colendi/blockchain-based-credit-scoring-outshines-the-big-three-cc169701ebb0> (Year: 2018).*

PCT International Search Report and Written Opinion in International Application No. PCT/CN2019/077215, dated Nov. 28, 2019, 9 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Blockchainhub.net [online], "Ethereum Smart Contract Development," Dec. 2017, retrieved on Apr. 30, 2020, retrieved from URL<:https://blockchainhub.net/smart-contracts/>, 10 pages.

Extended European Search Report in European Application No. 19725911.2, dated Apr. 30, 2020, 10 pages.

Liu et al., "Off-chain Data Fetching Architecture for Ethereum Smart Contract," 2018 International Conference on Cloud Computing, Big Data and Blockchain (ICCBB), Nov. 2018, pp. 1-4.

Clearmatics [online], "Ion Stage 2: Cross-Chain Smart Contract Development (Part 4)", Nov. 8, 2018, retreived on Sep. 2, 2020, retrieved from: URL<https://medium.com/clearmatics/ion-stage-2-cross-chain-smart-contract-development-part-4-d9bcc.5abe2ff>, 10 pages.

Medium.com [online], "Clearmatics, Ion Stage 2: Cross-Chain Smart Contract Development (Part 4)" Nov. 8, 2018, retrieved on Dec. 14, 2020, retrieved from URL<https://medium.com/clearmatics/ion-stage-2-cross-chain-smart-contract-development-part-4-d9bcc5abe2ff>, 13 pages.

ASIC, [online], "Account aggregation in the financial services sector," Consultation paper 20, May 2001, retrieved on Feb. 12, 2021, retrieved from URL <https://download/asic.gov.au/media/19933166/what-do-you-want-to-do-with-acctaggreg_issues.pdf>, 65 pages.

* cited by examiner

MANAGING HOUSING SCORES USING SMART CONTRACTS IN BLOCKCHAIN NETWORKS

CROSS-REFERENCE TO RELATED APPLICATIONS

This application is a continuation of PCT Application No. PCT/CN2019/077215, filed on Mar. 6, 2019, which is hereby incorporated by reference in its entirety.

TECHNICAL FIELD

This specification relates to managing housing scores using smart contracts in blockchain networks.

BACKGROUND

Distributed ledger systems (DLSs) enable participating entities to securely, and immutably store data. DLSs can also be referred to as consensus networks or blockchain networks, without referencing any particular use case. Examples of blockchain network can include consortium blockchain networks provided for a select group of entities. A consortium blockchain network can control the consensus process for the select group of entities. The consortium blockchain network includes an access control layer.

In a certain region (e.g., a city, town, county, state, or another administrative or governmental division), a housing score (or point, credit, or another metric) can be assigned to each resident in the region to evaluate the resident's rights (e.g., eligibility, priority, privilege, and benefits) in renting or purchasing a residence (e.g., an apartment, a condo, or a house) in the region.

Traditional housing score management system is centralized, for example, being controlled by a governing body (e.g., the government). The housing score data are typically not easily accessible to the public. For example, the housing score data may be obtained only queries or inquiries by service personnel or agents through a designated agency or designated service platform. In some embodiments, cumbersome registration procedures are required before one can submit the inquiries or gain access to the housing score data. It is desirable to have an effective means to quickly query or inquiry the housing score data, especially for cross-region (e.g., cross-city or cross-province) inquires.

SUMMARY

This specification describes technologies for managing housing scores using a smart contracts in a blockchain network.

Implementations of this specification are directed to a housing score management scheme for inquiring, changing, updating, determining, or otherwise managing housing scores of residents. In some embodiments, a housing score of a resident in a region indicates the resident's rights in renting or purchasing a residence in the region. In some embodiments, a smart contract can be used to implement the housing score management scheme as a distributive system in a blockchain network for managing the housing scores of residents in the region. In some embodiments, the housing score management scheme can provide easier access and enhanced transparency to the public, helping create a dynamic, healthy, orderly, and sustainable housing renting and purchasing ecosystem.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
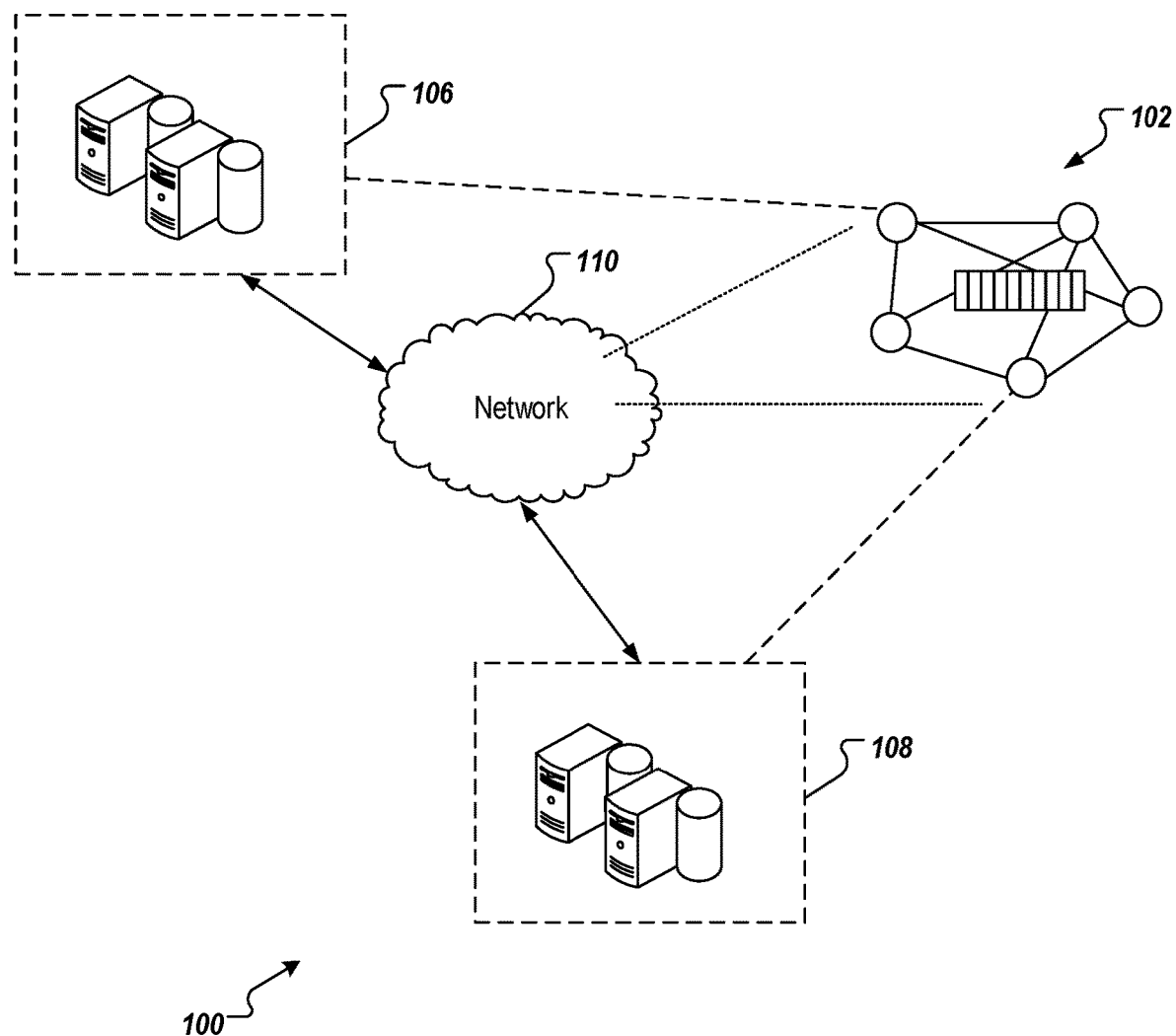
FIG. 1 is a diagram illustrating an example of an environment that can be used to execute embodiments of this specification.

Implementations of this specification are directed to a housing score management scheme for inquiring, changing, updating, determining, or otherwise managing housing scores of residents. In some embodiments, a housing score of a resident in a region indicates the resident's rights in renting or purchasing a residence in the region. In some embodiments, a smart contract can be used to implement the housing score management scheme as a distributive system in a blockchain network for managing the housing scores of residents in the region. In some embodiments, the housing score management scheme can provide easier access and enhanced transparency to the public, helping create a dynamic, healthy, orderly and sustainable housing renting and purchasing ecosystem.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
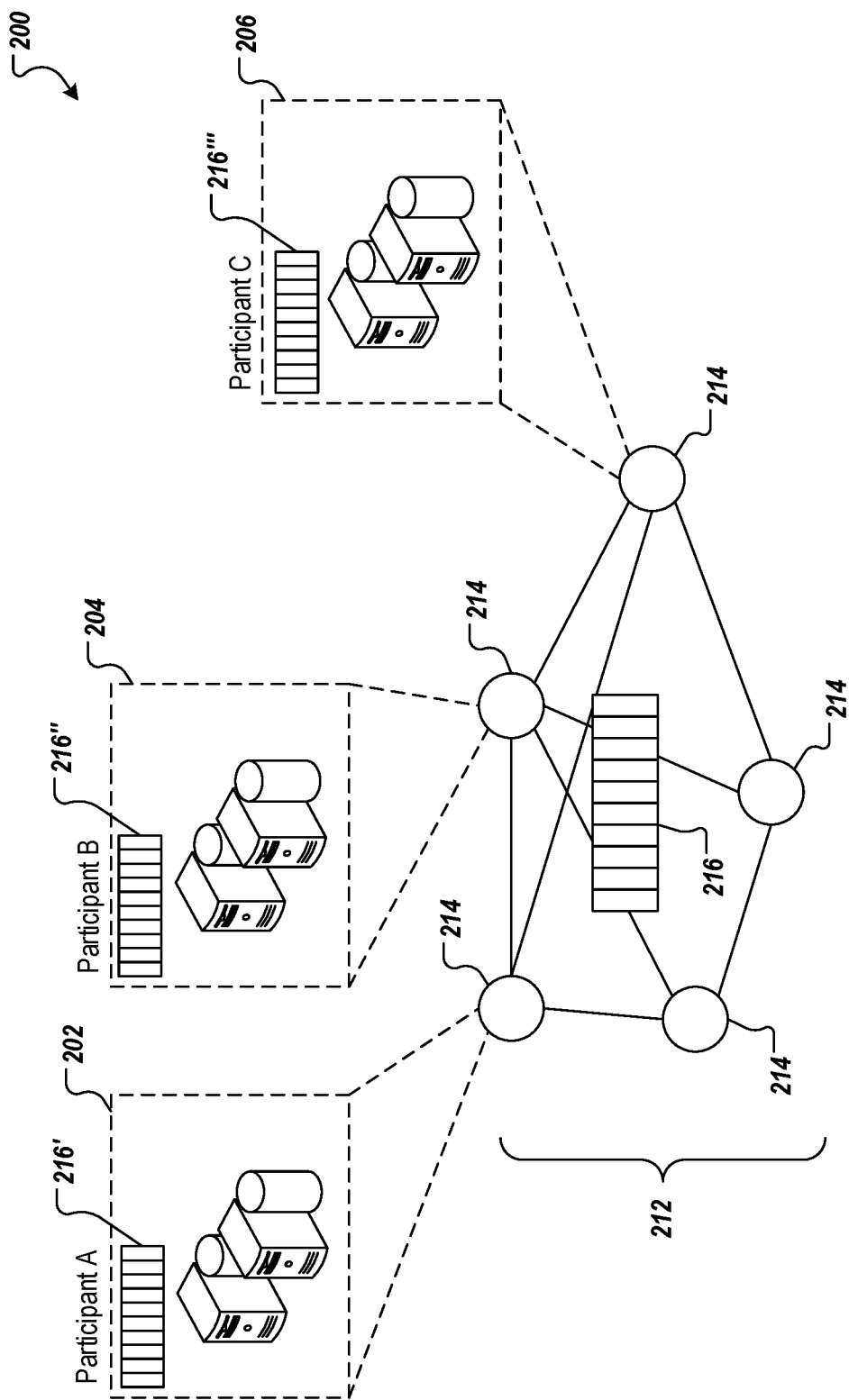
FIG. 2 is a diagram illustrating an example of an architecture in accordance with embodiments of this specification.

FIG. 2 depicts an example of an architecture 200 in accordance with embodiments of this specification. The example architecture 200 includes participant systems 202, 204, 206 that correspond to Participant A, Participant B, and Participant C, respectively. Each participant (e.g., user, enterprise) participates in a blockchain network 212 provided as a peer-to-peer network including a multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some blockchain networks, so-called smart contracts can be executed. Smart contracts can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network. In some examples, the contract parties can include entities (e.g., business enterprises) that are associated with the smart contract (e.g., as parties to the smart contract).

In further detail, smart contracts are provided as computer-executable programs that execute on blockchains (e.g., a node within a blockchain network). A smart contract contains a set of pre-defined rules under which the parties to that smart contract agree to interact with each other. If the pre-defined rules of the smart contract are met, the agreement defined in the smart contract is automatically enforced. A smart contract is usually tamper resistant and facilitates, verifies, and enforces the negotiation or performance of an agreement or transaction.

Figure 3:
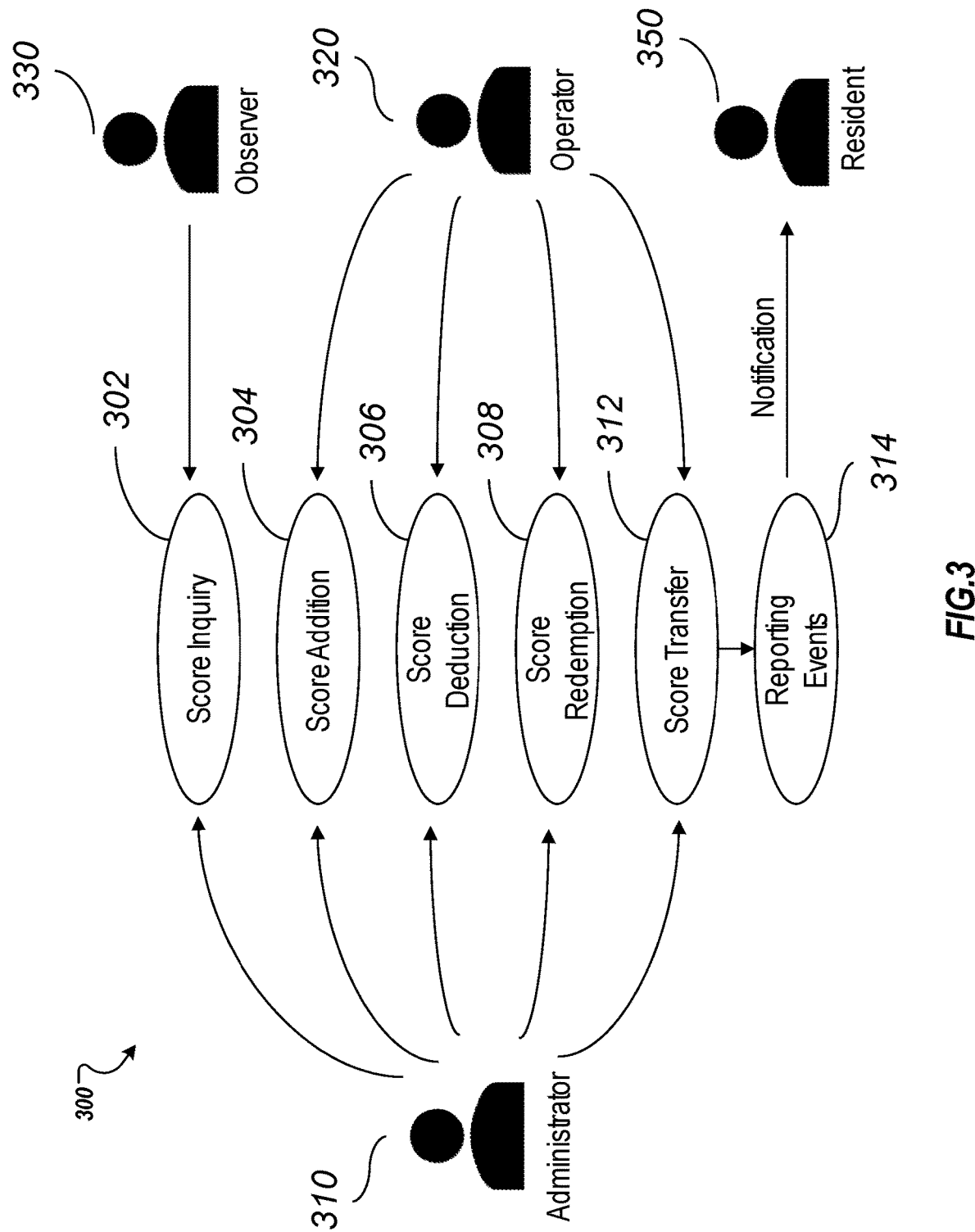
FIG. 3 is a diagram illustrating an example of a housing score management scheme that manages housing scores using a smart contract in a blockchain network, in accordance with embodiments of this specification.

FIG. 3 is a diagram illustrating an example of a housing score management scheme 300 that manages housing scores using a smart contract in a blockchain network, in accordance with embodiments of this specification. As shown, the housing score management scheme 300 can use a smart contract to define multiple operations with respect to housing scores of residents 350 of a region (also referred to housing score operations).

In some embodiments, each of the operations can be implemented as an application programming interface (API), a service, a function, or a combination thereof. The operations be specified using routines, data structures, and object classes of one or more computer language.

The housing score operations can include, for example, a score inquiry operation 302, a score addition operation 304, a score deduction operation 306, a score redemption operation 308, and a score transfer operation 312. The housing score operations can include additional or different operations with respect to housing scores of residents 350.

Figure 4:
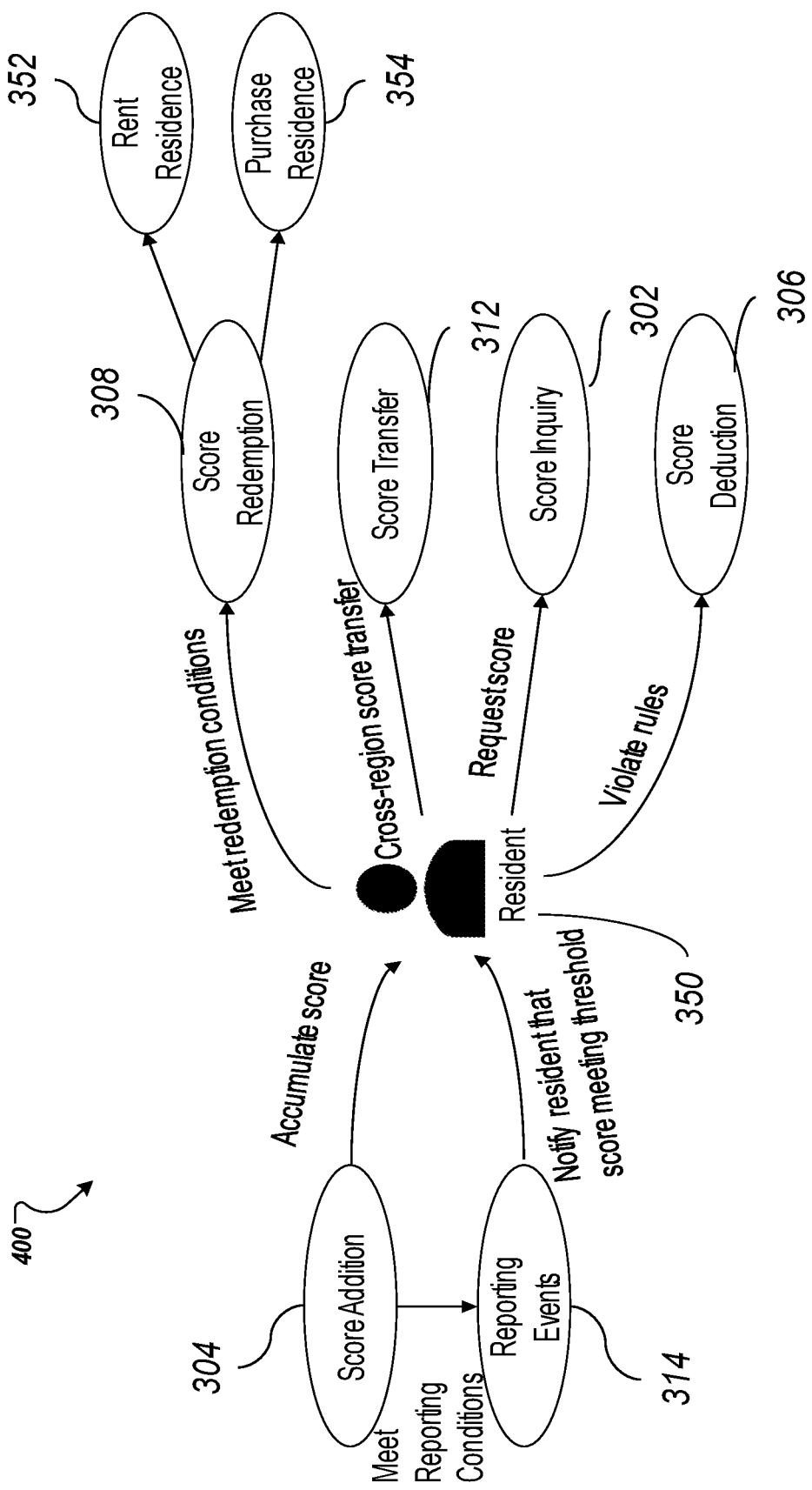
FIG. 4 is a diagram illustrating examples of housing score operations defined based on activities of a resident in a region, in accordance with embodiments of this specification.

FIG. 4 is a diagram 400 illustrating examples of housing score operations defined based on activities of a resident 350 in a region, in accordance with embodiments of this specification. The activities of the resident 350 can cause one or more housing score operations that inquire, change, update, determine, or otherwise manage a housing score of the resident 350. In some embodiments, an execution history of the one or more housing score operations using the smart contract can be recorded in the blockchain network. The recorded execution history can be available for inspection and subject to supervision, thus providing enhanced transparency on the housing scores of the residents 350 in the region. In some embodiments, the resident 350 may request to review his or her own housing score by calling the score inquiry operation 302. In some embodiments, one or more residents 350 can view their points and corresponding rights in real time online through the housing score management system. In some embodiments, a resident 350 may request to review a housing score of a third party, if the resident has the authority to call the score inquiry operation 302 on the housing score of a third party.

In some embodiments, the score addition operation 304 can be triggered by accumulating the housing score by, for example, through the resident 350's living in the region. For example, upon the resident 350's rental or purchase of a residence in the region, the score addition operation 304 can be triggered to increase the resident 350's housing score in the region. Upon execution of the score addition operation 304 using the smart contract, the resident 350's housing score can be updated and recorded in the blockchain network, for example, in real time or substantially real time. In some embodiments, the score addition operation 304 can be further triggered by the resident 350's living in the region for a duration (e.g., over certain threshold). In some embodiments, the score addition operation 304 can be triggered by the resident 350's status or qualifications (e.g., holding a college or advanced degree, being employed in the region, or giving birth to a child in the region). In some embodiments, the score addition operation 304 can be triggered by the resident 350's contributions or honorable activities to the region (e.g., investing in the region or participating in public service or volunteering work in the community), for example, in rewarding the resident 350. In some embodiments, the score addition operation 304 can be defined based on additional or different activities of the resident 350.

In some embodiments, as the housing score accumulates, if the housing score reaches one or more triggering thresholds or meets one or more reporting condition, one or more reporting events 314 can be generated to inform the resident 350 that the resident 350 have acquired a corresponding housing score. The housing score may correspond to certain rights, such as, an eligibility, priority, privilege, or benefit in renting our purchase a residence in the city. In some embodiments, an automatic notification or alert can be generated and transmitted to a client node associated with the resident 350 by the housing score management system. The benefits or rights can include, for example, eligibility or priority to buy a residence, eligibility or priority to have a registered residence, discount in rent or purchase price of a residence, discount on tax in the region.

In some embodiments, if the housing score of the resident 350 reaches one or more redemption conditions, the resident 350 may choose to redeem the corresponding benefits or rights, which can trigger or invoke the score redemption operation 308. As an example, if the housing score of the resident 350 reaches or exceed a threshold that allows the resident 350 to rent a residence 352 or purchase a residence 354 in the region, the resident 350 may choose to exercise such an eligibility. The redemption may or may not consume the housing score of the resident 350. In some embodiments, the score redemption operation 308 can be triggered to deduct a certain amount from the resident 350's housing score. Upon execution of the score redemption operation 308 using the smart contract, the resident 350's housing score can be updated and recorded in the blockchain network, for example, in real time or substantially real time. In some embodiments, the score redemption operation 308 can be defined based on additional or different activities of the resident 350. For example, the score redemption operation 308 can be triggered by the resident 350's redemption of a discount on a rent or purchase price of a residence in the region.

In some embodiments, if the resident 350 violates one or more policies, regulations, laws or rules, the housing score of the resident 350 may be decreased, for example, as a punishment to the resident 350. In some embodiments, the score deduction operation 306 can be triggered to deduct a certain amount from the resident 350's housing score. Upon execution of the score deduction operation 306 using the smart contract, the resident 350's housing score can be updated and recorded in the blockchain network, for example, in real time or substantially real time. In some embodiments, the score deduction operation 306 can be defined based on additional or different activities of the resident 350.

In some embodiments, if the resident 350 goes to work and live in another region, his or her housing score can be transferred to the another region, for example, by invoking the score transfer operation 312. In some embodiments, two or more different regions may use the same or different housing score management schemes. For example, two different regions may use respective smart contracts to define respective housing score operations for manages housing scores of respective residents in the two different regions. In some embodiments, the respective smart contracts can be deployed in a single blockchain network. In this case, the transfer process can be performed using two smart contracts by executing the score transfer operation 312 defined in the two smart contracts (with appropriate interfaces). In some embodiments, the respective smart contracts can be deployed in different blockchain networks. In this case, the transfer process can be performed using by cross-chain operations between two blockchain systems.

Referring back to FIG. 3, In some embodiments, the housing score management scheme 300 can use the smart contract to define multiple roles with corresponding authorities in managing the housing scores of residents in the region. For example, as illustrated in FIG. 3, the roles can include, for example, one or more of an administrator 310, an operator 320, and an observer 330. In some embodiments, the housing score management scheme 300 can use the smart contract to define additional or different roles, and each role may be authorized with additional or different operations on the housing scores.

In some embodiments, the administrator 310 is a role with the highest authority in the smart contract for managing the housing scores of residents in the region. For example, the administrator can be authorized to perform all of the housing score operations defined in the smart contract including the score inquiry operation 302, the score addition operation 304, the score deduction operation 306, the score redemption operation 308, and the score transfer operation 312.

In some embodiments, the operator 320 is a role authorized to perform a subset of the housing score operations defined in the smart contract. For example, the operator 320 may be authorized to perform the score addition operation 304, the score deduction operation 306, the score redemption operation 308, and the score transfer operation 312.

In some embodiments, the observer 330 is a role authorized to perform limited housing score operations defined in the smart contract. For example, the operator 330 may be authorized to perform only the score inquiry operation 302, but not any of the score addition operation 304, the score deduction operation 306, the score redemption operation 308, and the score transfer operation 312.

Figure 5:
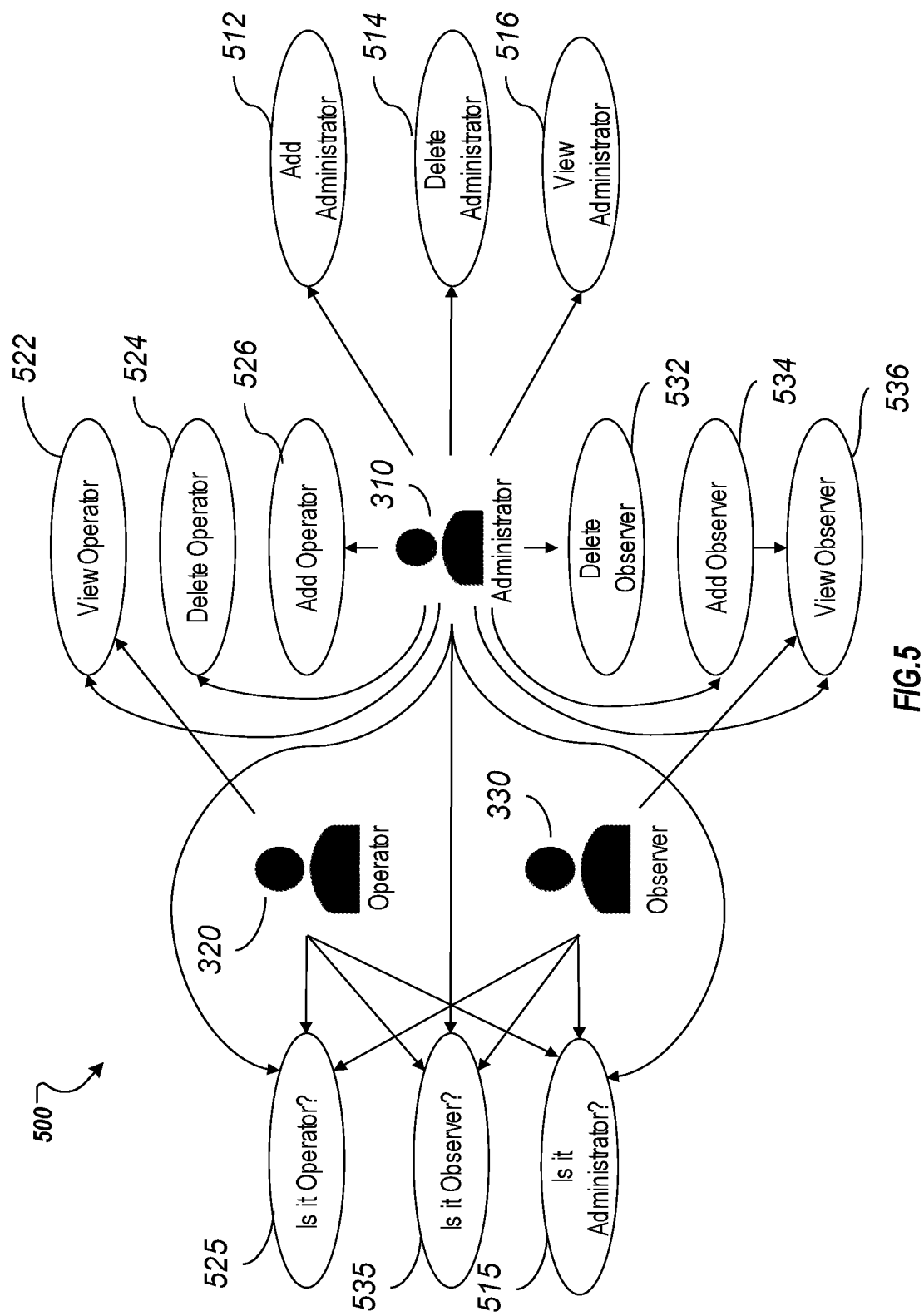
FIG. 5 is a diagram illustrating examples of operations of different roles in managing housing scores of residents in a region, in accordance with embodiments of this specification.

FIG. 5 is a diagram 500 illustrating examples of operations of different roles in managing housing scores of residents in a region, in accordance with embodiments of this specification. In some embodiments, each role may correspond to a respective list that includes one or more accounts that are specified with the respective roles and given corresponding authorities. For example, the housing score management scheme 300 can include an administrator list including one or more accounts that have administrator authority in managing the housing scores of residents in the region. In some embodiments, each of the one or more accounts in the administrator list can be referred to as an administrator 310. Similarly, an operator list can be specified that includes one or more accounts that have operator authority in managing the housing scores of residents in the region; and each of the one or more accounts in the operator list can be referred to as an operator 320. In some embodiments, an observer list can be specified that includes one or more accounts that have observer authority in managing the housing scores of residents in the region; of the one or more accounts in the administrator list can be referred to as an administrator 310 and each of the one or more accounts in the observer list can be referred to as an observer 330.

In some embodiments, each account can be associated with a person, an organization, or another entity. Each account can participate in managing the housing scores using smart contracts in the blockchain network via one or more computing systems (e.g., computing systems 106, 108), participant systems (e.g., participant systems 202, 204, 206), and/or nodes (e.g., client nodes or consensus nodes of the blockchain network).

In some embodiments, the smart contract can further define management operations of the administrator 310. For example, as illustrated in FIG. 5, the management operations of the administrator 310 can include operations on administrator management (e.g., add administrator operation 512, delete administrator operation 514, view administrator operation 516), operator management (e.g., add operator operation 522, delete operator 524, view operator operation 526), and observer management (e.g., add observer operation 532, delete observer operation 534, view observer operation 536). For example, an administrator 310 can add another administrator 310 to the administrator list, for example, by calling the add administrator operation 512 defined in the smart contract. As another example, an administrator 310 can delete an operator 320 from the operator list, for example, by calling the delete operator operation 524 defined in the smart contract. As yet another example, an administrator 310 can view all authorized observers 330 in the observer list, for example, by calling the view observer operation 536 defined in the smart contract.

In some embodiments, the smart contract can further define management operations of the operator 320. For example, as illustrated in FIG. 5, the management operations of the operator 320 may only include view operator operation 526. For example, an operator 320 can view all authorized operator 320 in the operator list, for example, by calling the view operator operation 522 defined in the smart contract.

In some embodiments, the smart contract can further define management operations of the observer 330. For example, as illustrated in FIG. 5, the management operations of the observer 330 may only include view operator operation 526. For example, an observer 330 can view all authorized observer 330 in the observer list, for example, by calling the view operator operation 536 defined in the smart contract.

In some embodiments, before an account is able to call any operation defined in the smart contract, a role verification process can be performed. For example, whether the account is given an administrator role 515, whether the account is given an operator role 525, and whether the account is given an observer role 535 can be determined. In some embodiments, upon verifying that the account is given a certain role, the corresponding operations authorized for such a role can be called by the account in managing the housing scores using smart contracts in the blockchain network.

Figure 6:
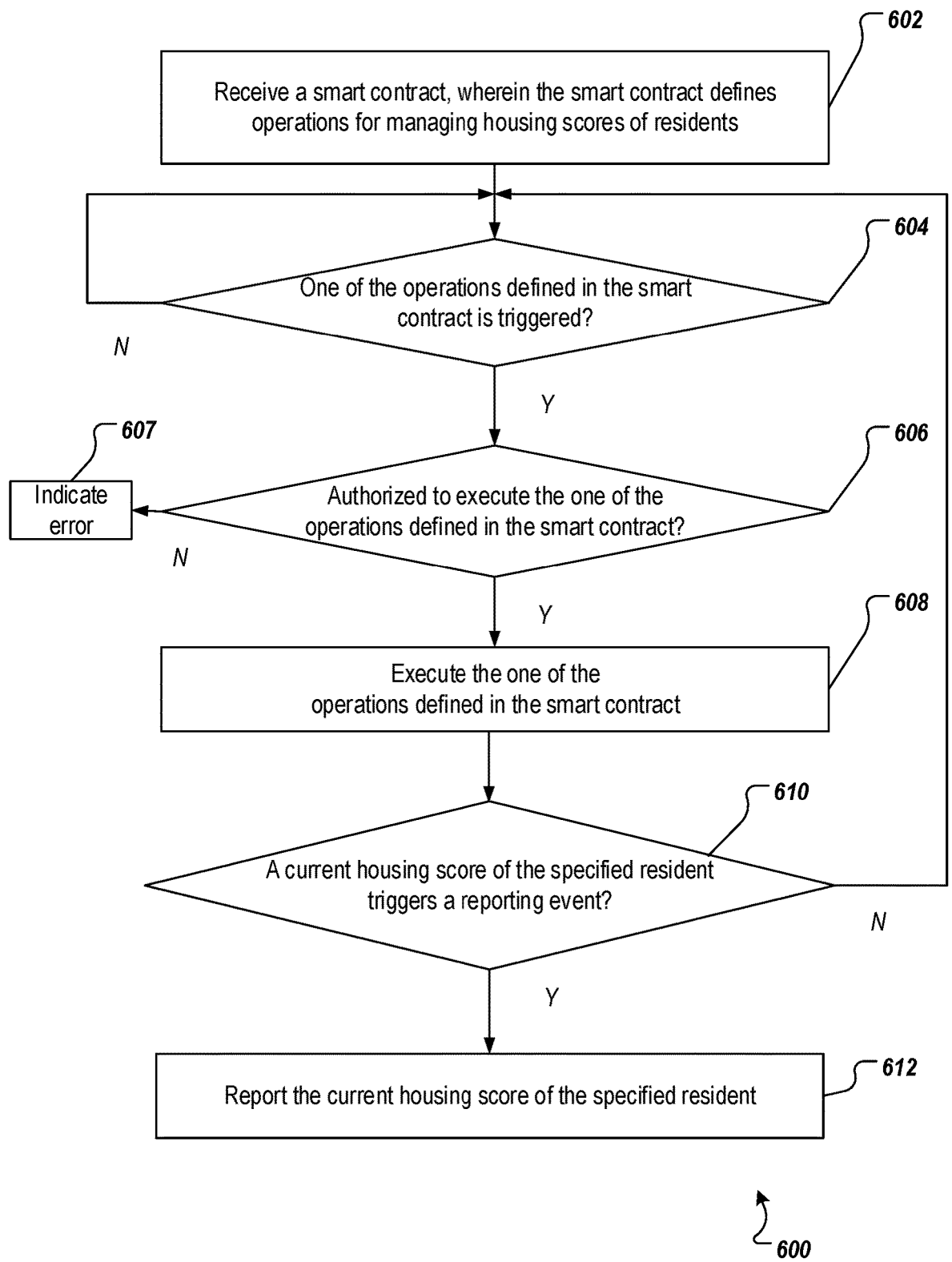
FIG. 6 depicts an example of a process for managing housing scores using smart contracts in a blockchain network in accordance with embodiments of this specification.

FIG. 6 depicts an example of a process 600 for managing housing scores using smart contracts in a blockchain network in accordance with embodiments of this specification. The example process 600 may be performed using one or more computer-executable programs executed using one or more computing devices. In some examples, the example process 600 can be performed by a distributed system (e.g., the blockchain system 100 of FIG. 1) for managing housing scores using smart contracts in a blockchain network. For convenience, the process 600 will be described as being performed by a system of one or more computers, located in one or more locations, and programmed appropriately in accordance with this specification. For example, a distributed system, e.g., the blockchain system 100 of FIG. 1, appropriately programmed, can perform the process 600. In some embodiments, some or all operations of the process 600 can be performed by a node such as a consensus node of a blockchain network. For example, e.g., node 214 of the architecture 200, appropriately programmed, can perform some or all operations of the process 600. The node can be implemented, for example, using one or more computing devices (e.g., computing devices 106, 108).

At 602, a smart contract is received by a node of the blockchain network. The smart contract defines multiple operations for managing housing scores of residents. A housing score of a resident in a specified region indicates the resident's rights in renting or purchasing a residence in the specified region. The multiple operations can include the operations described with respect to FIGS. 3-5 such as housing score operations 302-312 and management operations 512-516, 524-526, and 534-536. As an example, the multiple operations include a score inquiry operation, a score addition operation, a score deduction operation, a score redemption operation, and a score transfer operation. The multiple operations can include additional or different operations.

In some embodiments, the smart contract defines multiple roles, and each role is authorized with a respective set of the multiple operations, for example, as described with respect to FIGS. 3-5. For example, the smart contract defines an administrator role and the smart contract defines that the administrator role is authorized to execute all of the multiple operations. In some embodiments, the smart contract defines that the administrator is authorized to execute operations of adding, deleting, or inquiring one or more of the multiple roles defined in the smart contract. In some embodiments, the smart contract defines an operator role and the smart contract defines that the operator role is authorized to execute one or more of: the score addition operation, the score deduction operation, the score redemption operation, and the score transfer operation. In some embodiments, the smart contract defines an observer and the smart contract defines that the observer role is authorized to execute the score inquiry operation only.

In some embodiments, the smart contract is generated by a deploying server that is associated with a governing body (e.g., the government) of the region. In some embodiments, the deploying server 306 deploys the smart contracts to the blockchain network. In some examples, the deploying server generates and submits a transaction of smart contract to the blockchain network. The transaction of smart contract may include a program and an originator of the smart contract. The nodes (e.g., consensus nodes) of the blockchain network verify the transaction of the smart contract. After the mining nodes successfully verify the transaction of the smart contract, the smart contract can be deployed in the blockchain network in a distributed manner and has a unique smart contract address from which the smart contract 310 can be called. In some embodiments, a node accesses the blockchain network and receives the smart contract. In some embodiments, the node processes the smart contract and registers (creates) an account with the smart contract. The account can be associated with a role defined in the smart contract. In some embodiments, the node is a consensus node of the blockchain network and the account of the node is given an administrative role for managing housing scores of one or more specified residents in the region. In some embodiments, the node is a consensus node of the blockchain network and the account of the node is given an operator role for managing housing scores of one or more specified residents in the region. In some embodiments, the node is a client node of the blockchain network and the account of the node is given an observer role that is only able to view one or more housing scores and one or more observer lists corresponding to one or more specified residents in the region.

At 604, whether one of the multiple operations for managing housing scores of residents is triggered can be determined by the node of the blockchain network. In some embodiments, such a determination can be made based on one or more requests or data received by the node of the blockchain network. The requests or data can reflect one or more activities of a specified resident that may affect a house score of the specified resident. In some embodiments, the node of the blockchain network can receive, from a client node associated with the specified resident, an inquiry of the housing score of the specified resident. In some embodiments, the node of the blockchain network can receive, from a client node associated with the specified resident, a transfer request of the housing score of the specified resident to another housing score management system deployed in the blockchain network. In some embodiments, the node of the blockchain network can receive, from a client node associated with the specified resident, a transfer request of the housing score of the specified resident to another housing score management system deployed in another blockchain network.

At 606, whether the node is authorized to execute the one of the multiple operations for managing a housing score of a specified resident can be determined by the node of the blockchain network. In some embodiments, such a determination can be made based on whether the node is associated with a role that is authorized to execute the one of the multiple operations defined in the smart contract for managing the housing score of the specified resident.

If the node is not authorized to execute the one of the multiple operations, an error may be indicated at 607, and the example process 600 may go back to 604 to monitor whether one of the multiple operations for managing housing scores of residents is triggered. In some embodiments, the example process 600 may end if the error occurs at 607.

At 608, in response to determining that the node is authorized to execute the one of the multiple operations, the one of the multiple operations defined in the smart contract for managing the housing score of the specified resident is executed by the node, for example, by making a smart contract call according to the examples as described with respect to FIGS. 3-5. In some embodiments, executing one of the multiple operations defined in the smart contract for managing a housing score of a specified resident includes one or more of: executing the score inquiry operation to check a current housing score of the specified resident; executing the score addition operation to increase the housing score of the specified resident in rewarding the specified resident; executing the score deduction operation to decrease the housing score of the specified resident in punishing the specified resident; executing the score redemption operation to redeem part or all of the housing score of the specified resident for one or more benefit in renting or purchasing a residence; or executing the score transfer operation to transfer the housing score of the specified resident to another housing score management system.

In some embodiments, in response to determining that the node is authorized to execute the score inquiry operation to check the housing score of the specified resident, the node may further report to the client node associated with the specified resident a history of the housing score of the specified resident.

In some embodiments, in response to determining that the node is authorized to execute the score transfer operation to transfer the housing score of the specified resident to another housing score management system, the node may further determine if the another housing score management system is deployed based in the same blockchain network using another smart contract or another blockchain network. If the another housing score management system is deployed in the blockchain network, the node can transfer the housing score of the specified resident to the another housing score management system by executing the score transfer operation defined in the smart contract and a score transfer operation defined in the another smart contract, appropriately programmed for complying with the interfaces of the two the score transfer operations. If the another housing score management system is deployed in the blockchain network, the node can transfer the housing score of the specified resident to the another housing score management system by invoking cross-chain operations between the blockchain network and the another blockchain network.

At 610, if a current housing score of the specified resident triggers a reporting event determined by the node, for example, according to the examples as described with respect to FIG. 4. In some embodiments, such a determination can be made based on one or more thresholds or criteria defined based on the housing score of the specified resident. If the current housing score of the specified resident does not trigger any reporting event, the process may go back to 604 to monitor whether one of the multiple operations for managing housing scores of residents is triggered.

At 612, in response to determining that the current housing score of the specified resident triggers the reporting event, the current housing score of the specified resident is reported by the node to the specified resident, for example, according to the examples as described with respect to FIG. 4. For example, the node can transmit the current housing score of the specified resident and/or a history of the housing score to a client node associated with the specified resident.

Figure 7:
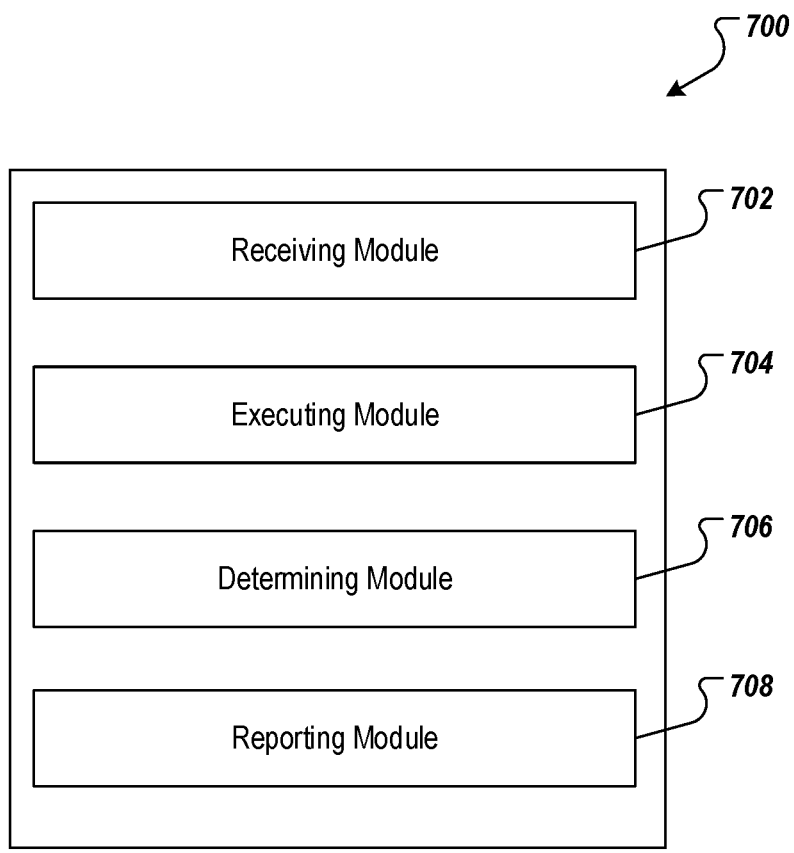
FIG. 7 depicts examples of modules of an apparatus in accordance with embodiments of this specification.

FIG. 7 is a diagram of an example of modules of an apparatus 700 in accordance with embodiments of this specification. The apparatus 700 can be an example of an embodiment of a node in a blockchain network for managing housing scores of residents using a smart contract executing within a blockchain network, wherein a housing score of a resident indicating the resident's rights in renting or purchasing a residence. The apparatus 700 can correspond to the embodiments described above, and the apparatus 700 includes the following: a receiving module 702 for receiving a smart contract, wherein the smart contract defines a multiple operations for managing housing scores of residents, and the multiple operations include: a score inquiry operation, a score addition operation, a score deduction operation, a score redemption operation, and a score transfer operation; an executing module 704 for executing one of the multiple operations defined in the smart contract for managing a housing score of a specified resident; a determining module 706 for determining if a current housing score of the specified resident triggers a reporting event; and a reporting module 708 for reporting, to the specified resident, the current housing score of the specified resident in response to determining that the current housing score of the specified resident triggers the reporting event.

In an optional embodiment, executing one of the multiple operations defined in the smart contract for managing a housing score of a specified resident includes one or more of: executing the score inquiry operation to check a current housing score of the specified resident; executing the score addition operation to increase the housing score of the specified resident in rewarding the specified resident; executing the score deduction operation to decrease the housing score of the specified resident in punishing the specified resident; executing the score redemption operation to redeem part or all of the housing score of the specified resident for one or more benefit in renting or purchasing a residence; or executing the score transfer operation to transfer the housing score of the specified resident to another housing score management system.

In an optional embodiment, the smart contract defines a multiple roles, and each role is authorized with a respective set of the multiple operations.

In an optional embodiment, the smart contract defines an administrator role and the smart contract defines that the administrator role is authorized to execute all of the multiple operations.

In an optional embodiment, the smart contract defines that the administrator is authorized to execute operations of adding, deleting, or inquiring one or more of the multiple roles defined in the smart contract.

In an optional embodiment, the smart contract defines an operator role and the smart contract defines that the operator role is authorized to execute one or more of: the score addition operation, the score deduction operation, the score redemption operation, and the score transfer operation.

In an optional embodiment, the smart contract defines an observer and the smart contract defines that the observer role is authorized to execute the score inquiry operation only.

In an optional embodiment, the apparatus 700 further includes the following: a second determining sub-module for determining whether the node is associated with a role that is authorized to execute the one of the multiple operations defined in the smart contract for managing the housing score of the specified resident.

In an optional embodiment, the apparatus 700 further includes the following: a first receiving sub-module for receiving, from a client node associated with the specified resident, an inquiry of the housing score of the specified resident; and reporting, by the node to the client node associated with the specified resident, a history of the housing score of the specified resident.

In an optional embodiment, the apparatus 700 further includes the following: a second receiving sub-module for receiving, from a client node associated with the specified resident, a transfer request of the housing score of the specified resident to another housing score management system deployed in the blockchain network; and a first transferring module for transferring the housing score of the specified resident to the another housing score management system by executing the score transfer operation defined in the smart contract.

In an optional embodiment, the apparatus 700 further includes the following: a second receiving sub-module for receiving, from a client node associated with the specified resident, a transfer request of the housing score of the specified resident to another housing score management system deployed in another blockchain network; and a second transferring module for transferring, by the node, the housing score of the specified resident to the another housing score management system by invoking cross-chain operations between the blockchain network and the another blockchain network.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a blockchain housing scores management apparatus. The blockchain housing scores management apparatus can be an example of a blockchain node configured to manage housing scores of residents using a smart contract executing within a blockchain network, wherein a housing score of a resident indicating the resident's rights in renting or purchasing a residence. An execution body in essence can be an electronic device, and the electronic device includes the following: one or more processors; and a memory configured to store an executable instruction of the one or more processors.

The techniques described in this specification produce one or more technical effects. In some embodiments, a smart contract can be used to specify or otherwise define operations on housing scores of residents in a region. In some embodiments, the smart-contract based housing score operations can be executed by nodes of a blockchain network so that a housing score of a specified resident in a region can be dynamically and automatically determined based on execution of the one or more operations defined in smart contracts in blockchain networks. In some embodiments, the smart-contract based housing score operations can be used to execute trusted operations and transactions that may affect the housing score. In some embodiments, the operations and transactions are trackable, irreversible, and can be tamper resistant, thus providing enhanced transparency and creating an open, fair, secure, and trusted housing score management scheme that encourages and incentivizes the residents to contribute to the region. The housing score management scheme can provide easy access, inquiry, and supervision of the housing scores of the public, preventing abuse or corruption by one or more governing bodies or agencies. In some embodiments, the smart contract also defines different roles (e.g., an administrator, operator, or observer) with different authorities with respect to the housing score operations, allowing flexibilities in managing the housing scores. In some embodiments, the smart-contract based housing score management scheme can also enable a cross-region transfer of the housing score by invoking a transfer function defined in the smart contract or cross-chain operations.

Described embodiments of the subject matter can include one or more features, alone or in combination.

For example, in a first embodiment, a computer-implemented method for managing housing scores of residents using a smart contract executing within a blockchain network, a housing score of a resident indicating the resident's rights in renting or purchasing a residence, the method includes: receiving, by a node of the blockchain network, a smart contract that defines operations for managing housing scores of residents, the operations including: a score inquiry operation, a score addition operation, a score deduction operation, a score redemption operation, and a score transfer operation; executing, by the node, one of the operations defined in the smart contract for managing a housing score of a specified resident; determining, by the node, if a current housing score of the specified resident triggers a reporting event; and in response to determining that the current housing score of the specified resident triggers the reporting event, reporting, by the node to the specified resident, the current housing score of the specified resident. The foregoing and other described embodiments can each, optionally, include one or more of the following features:

A first feature, combinable with any of the following features, executing one of the multiple operations defined in the smart contract for managing a housing score of a specified resident includes one or more of: executing the score inquiry operation to check a current housing score of the specified resident; executing the score addition operation to increase the housing score of the specified resident in rewarding the specified resident; executing the score deduction operation to decrease the housing score of the specified resident in punishing the specified resident; executing the score redemption operation to redeem part or all of the housing score of the specified resident for one or more benefit in renting or purchasing a residence; or executing the score transfer operation to transfer the housing score of the specified resident to another housing score management system.

A second feature, combinable with any of the previous or following features, specifies that the smart contract defines a multiple roles, and each role is authorized with a respective set of the multiple operations.

A third feature, combinable with any of the previous or following features, specifies that the smart contract defines an administrator role and the smart contract defines that the administrator role is authorized to execute all of the multiple operations.

A fourth feature, combinable with any of the previous or following features, specifies that the smart contract defines that the administrator is authorized to execute operations of adding, deleting, or inquiring one or more of the multiple roles defined in the smart contract.

A fifth feature, combinable with any of the previous or following features, specifies that the smart contract defines an operator role and the smart contract defines that the operator role is authorized to execute one or more of: the score addition operation, the score deduction operation, the score redemption operation, and the score transfer operation.

A sixth feature, combinable with any of the previous or following features, specifies that the smart contract defines an observer and the smart contract defines that the observer role is authorized to execute the score inquiry operation only.

A seventh feature, combinable with any of the previous or following features, specifies that the method further including determining whether the node is associated with a role that is authorized to execute the one of the multiple operations defined in the smart contract for managing the housing score of the specified resident.

An eighth feature, combinable with any of the previous or following features, specifies that the method further including receiving, by the node from a client node associated with the specified resident, an inquiry of the housing score of the specified resident; and reporting, by the node to the client node associated with the specified resident, a history of the housing score of the specified resident.

A ninth feature, combinable with any of the previous or following features, specifies that the method further including receiving, by the node from a client node associated with the specified resident, a transfer request of the housing score of the specified resident to another housing score management system deployed in the blockchain network; and transferring, by the node, the housing score of the specified resident to the another housing score management system by executing the score transfer operation defined in the smart contract.

A tenth feature, combinable with any of the previous or following features, specifies that the method further including receiving, by the node from a client node associated with the specified resident, a transfer request of the housing score of the specified resident to another housing score management system deployed in another blockchain network; and transferring, by the node, the housing score of the specified resident to the another housing score management system by invoking cross-chain operations between the blockchain network and the another blockchain network.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for managing housing scores of residents using a smart contract in a blockchain network, a housing score of a resident indicating resident's rights in renting or purchasing a residence, the method comprising:
   receiving, by a node of the blockchain network, the smart contract of a housing score management system of a first region deployed in the blockchain network, wherein the smart contract defines a plurality of operations, the plurality of operations comprise computer-implemented operations that update the housing scores of residents, and the plurality of operations comprise:
      a score addition operation configured to increase a housing score of a specified resident,
      a score deduction operation configured to decrease the housing score of the specified resident, and
      a score transfer operation configured to transfer the housing score of the specified resident to another housing score management system of a second region deployed in a second blockchain network;
   determining, by the node, if one of the plurality of operations defined in the smart contract is triggered;
   in response to determining that the one of the plurality of operations defined in the smart contract is triggered, executing, by the node, the one of the plurality of operations defined in the smart contract to update the housing score of the specified resident;
   determining, by the node, if a current housing score of the specified resident triggers a reporting event; and
   in response to determining that the current housing score of the specified resident triggers the reporting event, reporting, by the node to the specified resident, the current housing score of the specified resident.

2. The computer-implemented method of claim 1, wherein the plurality of operations further comprise a score inquiry operation and a score redemption operation, and executing one of the plurality of operations defined in the smart contract to update the housing score of the specified resident comprises one or more of:
   executing the score inquiry operation to check the current housing score of the specified resident;
   executing the score addition operation to increase the housing score of the specified resident in rewarding the specified resident;
   executing the score deduction operation to decrease the housing score of the specified resident in punishing the specified resident;
   executing the score redemption operation to redeem part or all of the housing score of the specified resident for one or more benefit in renting or purchasing the residence; or
   executing the score transfer operation to transfer the housing score of the specified resident to the another housing score management system.

3. The computer-implemented method of claim 1, wherein the smart contract defines a plurality of roles, and each role is authorized with a respective set of the plurality of operations.

4. The computer-implemented method of claim 2, wherein the smart contract defines an administrator role and the smart contract defines that the administrator role is authorized to execute all of the plurality of operations.

5. The computer-implemented method of claim 2, wherein the smart contract defines that an administrator role is authorized to execute operations of adding, deleting, or inquiring one or more of a plurality of roles defined in the smart contract.

6. The computer-implemented method of claim 2, wherein the smart contract defines an operator role and the smart contract defines that the operator role is authorized to execute one or more of:
   the score addition operation,
   the score deduction operation,
   the score redemption operation, and
   the score transfer operation.

7. The computer-implemented method of claim 2, wherein the smart contract defines an observer role and the smart contract defines that the observer role is authorized to execute the score inquiry operation only.

8. The computer-implemented method of claim 1, further comprising determining whether the node is associated with a role that is authorized to execute the one of the plurality of operations defined in the smart contract.

9. The computer-implemented method of claim 2, further comprising:
   receiving, by the node from a client node associated with the specified resident, an inquiry of the housing score of the specified resident; and
   reporting, by the node to the client node associated with the specified resident, a history of the housing score of the specified resident.

10. The computer-implemented method of claim 1, further comprising:
   receiving, by the node from a client node associated with the specified resident, a transfer request of the housing score of the specified resident to the another housing score management system deployed in the second blockchain network; and
   transferring, by the node, the housing score of the specified resident to the another housing score management system deployed in the second blockchain network by invoking cross-chain operations between the blockchain network and the second blockchain network.

11. A non-transitory, computer-readable storage medium storing one or more instructions executable by a computer system to perform operations for managing housing scores of residents using a smart contract in a blockchain network, a housing score of a resident indicating resident's rights in renting or purchasing a residence, the operations comprising:
   receiving, by a node of the blockchain network, the smart contract of a housing score management system of a first region deployed in the blockchain network, wherein the smart contract defines a plurality of operations, the plurality of operations comprise computer-implemented operations that update the housing scores of residents, and the plurality of operations comprise:
      a score addition operation configured to increase a housing score of a specified resident,
      a score deduction operation configured to decrease the housing score of the specified resident, and
      a score transfer operation configured to transfer the housing score of the specified resident to another housing score management system of a second region deployed in a second blockchain network;
   determining, by the node, if one of the plurality of operations defined in the smart contract is triggered;
   in response to determining that the one of the plurality of operations defined in the smart contract is triggered, executing, by the node, the one of the plurality of operations defined in the smart contract to update the housing score of the specified resident;
   determining, by the node, if a current housing score of the specified resident triggers a reporting event; and
   in response to determining that the current housing score of the specified resident triggers the reporting event, reporting, by the node to the specified resident, the current housing score of the specified resident.

12. The non-transitory, computer-readable storage medium of claim 11, wherein the plurality of operations further comprise a score inquiry operation and a score redemption operation, and executing one of the plurality of operations defined in the smart contract to update the housing score of the specified resident comprises one or more of:
   executing the score inquiry operation to check the current housing score of the specified resident;
   executing the score addition operation to increase the housing score of the specified resident in rewarding the specified resident;
   executing the score deduction operation to decrease the housing score of the specified resident in punishing the specified resident;
   executing the score redemption operation to redeem part or all of the housing score of the specified resident for one or more benefit in renting or purchasing the residence; or
   executing the score transfer operation to transfer the housing score of the specified resident to the another housing score management system.

13. The non-transitory, computer-readable storage medium of claim 11, wherein the smart contract defines a plurality of roles, and each role is authorized with a respective set of the plurality of operations.

14. The non-transitory, computer-readable storage medium of claim 12, wherein the smart contract defines an administrator role and the smart contract defines that the administrator role is authorized to execute all of the plurality of operations.

15. The non-transitory, computer-readable storage medium of claim 12, wherein the smart contract defines that an administrator role is authorized to execute operations of adding, deleting, or inquiring one or more of a plurality of roles defined in the smart contract.

16. The non-transitory, computer-readable storage medium of claim 12, wherein the smart contract defines an operator role and the smart contract defines that the operator role is authorized to execute one or more of:
the score addition operation,
the score deduction operation,
the score redemption operation, and
the score transfer operation.

17. The non-transitory, computer-readable storage medium of claim 12, wherein the smart contract defines an observer role and the smart contract defines that the observer role is authorized to execute the score inquiry operation only.

18. The non-transitory, computer-readable storage medium of claim 11, wherein the operations further comprise:
determining whether the node is associated with a role that is authorized to execute the one of the plurality of operations defined in the smart contract.

19. The non-transitory, computer-readable storage medium of claim 12, wherein the operations further comprise:
receiving, by the node from a client node associated with the specified resident, an inquiry of the housing score of the specified resident; and
reporting, by the node to the client node associated with the specified resident, a history of the housing score of the specified resident.

20. The non-transitory, computer-readable storage medium of claim 11, wherein the operations further comprise:
receiving, by the node from a client node associated with the specified resident, a transfer request of the housing score of the specified resident to the another housing score management system deployed in the second blockchain network; and
transferring, by the node, the housing score of the specified resident to the another housing score management system deployed in the second blockchain network by invoking cross-chain operations between the blockchain network and the second blockchain network.

21. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for managing housing scores of residents using a smart contract in a blockchain network, a housing score of a resident indicating resident's rights in renting or purchasing a residence, the operations comprising:
receiving, by a node of the blockchain network, the smart contract of a housing score management system of a first region deployed in the blockchain network, wherein the smart contract defines a plurality of operations, the plurality of operations comprise computer-implemented operations that update the housing scores of residents, and the plurality of operations comprise:
a score addition operation configured to increase a housing score of a specified resident,
a score deduction operation configured to decrease the housing score of the specified resident, and
a score transfer operation configured to transfer the housing score of the specified resident to another housing score management system of a second region deployed in a second blockchain network;
determining, by the node, if one of the plurality of operations defined in the smart contract is triggered;
in response to determining that the one of the plurality of operations defined in the smart contract is triggered, executing, by the node, the one of the plurality of operations defined in the smart contract to update the housing score of the specified resident;
determining, by the node, if a current housing score of the specified resident triggers a reporting event; and
in response to determining that the current housing score of the specified resident triggers the reporting event, reporting, by the node to the specified resident, the current housing score of the specified resident.

22. The computer-implemented system of claim 21, wherein the plurality of operations further comprise a score inquiry operation and a score redemption operation, and executing one of the plurality of operations defined in the smart contract to update the housing score of the specified resident comprises one or more of:
executing the score inquiry operation to check the current housing score of the specified resident;
executing the score addition operation to increase the housing score of the specified resident in rewarding the specified resident;
executing the score deduction operation to decrease the housing score of the specified resident in punishing the specified resident;
executing the score redemption operation to redeem part or all of the housing score of the specified resident for one or more benefit in renting or purchasing the residence; or
executing the score transfer operation to transfer the housing score of the specified resident to the another housing score management system.

23. The computer-implemented system of claim 21, wherein the smart contract defines a plurality of roles, and each role is authorized with a respective set of the plurality of operations.

24. The computer-implemented system of claim 22, wherein the smart contract defines an administrator role and the smart contract defines that the administrator role is authorized to execute all of the plurality of operations.

25. The computer-implemented system of claim 22, wherein the smart contract defines that an administrator role is authorized to execute operations of adding, deleting, or inquiring one or more of a plurality of roles defined in the smart contract.

26. The computer-implemented system of claim 22, wherein the smart contract defines an operator role and the smart contract defines that the operator role is authorized to execute one or more of:
the score addition operation,
the score deduction operation,
the score redemption operation, and
the score transfer operation.

27. The computer-implemented system of claim 22, wherein the smart contract defines an observer role and the smart contract defines that the observer role is authorized to execute the score inquiry operation only, and the operations further comprise determining whether the node is associated with a role that is authorized to execute the one of the plurality of operations defined in the smart contract.

28. The computer-implemented system of claim 22, wherein the operations further comprise:
   receiving, by the node from a client node associated with the specified resident, an inquiry of the housing score of the specified resident; and
   reporting, by the node to the client node associated with the specified resident, a history of the housing score of the specified resident.

29. The computer-implemented method of claim 1, wherein the housing score management system manages the housing scores of the residents in the first region, the another housing score management system manages housing scores of residents in the second region using a second smart contract deployed in the second blockchain network, and the method further comprises:
   transferring the housing score of the specific resident from the first region to the second region by invoking the score transfer operation using an interface between the smart contract deployed in the blockchain network and the second smart contract deployed in the second blockchain network.

30. The computer-implemented method of claim 1, further comprising:
   in response to determining a time duration of the specific resident in the first region or a honorable activity of the specific resident to the first region, invoking the score addition operation.

* * * * *

UNITED STATES PATENT AND TRADEMARK OFFICE
CERTIFICATE OF CORRECTION

PATENT NO. : 10,984,492 B2  
APPLICATION NO. : 16/587791  
DATED : April 20, 2021  
INVENTOR(S) : Zhiyuan Feng, Yanpeng Li and Long Cheng Page 1 of 1

It is certified that error appears in the above-identified patent and that said Letters Patent is hereby corrected as shown below:

In the Claims

Column 20/Lines 44-45, In Claim 1, delete "computer- implemented" and insert
-- computer-implemented --, therefor.

Column 22/Lines 16-17 (Approx.), In Claim 11, delete "computer- implemented" and insert
-- computer-implemented --, therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*